Patented Aug. 28, 1945

2,383,569

UNITED STATES PATENT OFFICE 2,383,569

MANUFACTURE OF ADHESIVE COMPOSITIONS

Kenneth Charles Roberts, Welwyn Garden City, England, assignor to The British Rubber Producers' Research Association, London, England, a body corporate of Great Britain No Drawing. Application January 5, 1943, Serial No. 471,366. In Great Britain April 13, 1942

6 Claims. (Cl. 260—768)

This invention relates to the manufacture of compositions, with more especial reference to adhesive or tacky materials, resistant to, and only slightly affected by, petrol and mineral oils, and thus suitable for use in association with articles likely to come into contact with such hydrocarbons or mineral oils.

In Specifications Nos. 2,227,777 and 2,275,951 processes for the preparation of modified rubber derivatives are described which involve reacting rubber with maleic anhydride in solution at elevated temperature and subsequently, or in some cases, at the same time, including also as a reactant a vinyl compound such as vinyl acetate, polyhydric alcohols such as glycols, amines and amino compounds, cellulose esters and ethers and unsaturated fatty acids or their esters, the products being tough, resinous or brittle materials.

It has now been found that products markedly different as regards their physical properties and notably possessing pronounced resistance to petrol and mineral oils may be obtained by a modification of the process to include, as a reactant, a monohydric alcohol with the rubber and maleic anhydride.

According to the present invention a process for the manufacture of adhesive masses or compositions consists in reacting rubber with maleic anhydride and one or more monohydric alcohols, in the presence of a suitable catalyst, preferably an organic peroxide catalyst.

Conveniently the reaction is carried out in an organic solvent such as benzene utilising ethyl alcohol with benzoyl peroxide as catalyst at a temperature of about 80° C., the product being conveniently handled in the form of a viscous solution, by evaporating and thus concentrating the reaction mixture. Alternatively the product may be isolated by precipitation of the reaction mixture by industrial alcohol.

In the practice of the invention, according to one example of the process, 68 gms., corresponding to 1 molecule of crepe rubber are dissolved in 1700 c. c. of benzene containing 32.8 gms. corresponding to $\frac{1}{3}$ of a molecule of maleic anhydride, 170 c. c. of ethyl alcohol and 6.8 gms. benzoyl peroxide as catalyst, the solution being heated for twenty-four hours under reflux at about 80° C. on a steam bath.

The product may conveniently be isolated in a crude state by removal of the solvent and excess ethyl alcohol or in a purified state by precipitation of the reaction mixture either as such, or concentrated by evaporation, into industrial alcohol.

The crude product is a highly tacky mass which is notably resistant to mineral oils and is insoluble in the common oxygenated solvents such as alcohol and acetone.

As aforementioned it may be conveniently handled in the form of the viscous solution which is obtained by concentrating the reaction mixture by evaporation and in some cases this procedure may be preferred as an alternative to its extraction by precipitation into industrial alcohol.

Other aliphatic monohydric alcohols, such as butyl or hexyl alcohol and monohydric cyclic alcohols, such as cyclohexanol, may be utilised as may other organic solvents such as xylene or tetralin and the temperature at which the reaction is carried out may vary between about 70° C. and 150° C. according to the nature of the solvents and reactants employed.

In carrying out my process I preferably employ approximately 4 molecules of alcohol and 1 molecule of maleic anhydride. It will, of course, be understood that the ratio above given may be varied within a fairly wide range depending upon whether the reaction is to be complete or partial. Theoretically, one molecule of maleic anhydride should be used with each molecule of alcohol but, practically, one has to effect a compromise between using a high proportion of alcohol to enhance (by its accessibility) its reaction on the one hand and avoid diluting the rubber and maleic anhydride components to the extent of seriously hindering their reaction on the other. Likewise, the alcohols used should be those in which the carbon atoms range from $C_1$ to $C_6$. The use of higher alcohols than $C_6$ are unsatisfactory. Throughout the claims, therefore, the ranges in the quantities above given and the range of carbon content of the alcohol should be considered as set forth above.

Other reaction conditions, e. g. the concentration and the relative proportions of the reactants may also be varied over a wide range without detracting from the advantageous characteristics of the product.

The adhesive may be compounded with a variety of pigments, fillers and soluble dyes, but possibly owing to the presence of free carboxylic acid groups it is modified and loses its tackiness when basic oxides and carbonates are added.

Similarly it sets or cements when subjected to prolonged heating at temperatures above 70° C. and resort may be had to this characteristic where it is desired to use the adhesive material as a bond between a film of, for example, a cellulosic material and an article to which it is to be attached.

What I claim is:

1. A process for the manufacture of adhesive compositions resistant to mineral oils which consists in simultaneously reacting rubber with maleic anhydride and a saturated monohydric aliphatic alcohol having from 2 to 6 carbon atoms, the said reactants having approximately the ratio of 2:1:4 in the presence of an organic peroxide catalyst at a temperature between 70° C. and 150° C.

2. A process for the manufacture of adhesive compositions according to claim 1, wherein the reaction is carried out in an organic solvent.

3. A process for the manufacture of adhesive compositions resistant to mineral oils which consists in simultaneously reacting rubber with maleic anhydride and ethyl alcohol having a ratio of 2:1:4 in the presence of benzoyl peroxide at a temperature of about 80° C.

4. A process for the manufacture of adhesive compositions resistant to mineral oils which consists in reacting rubber in solution in an organic solvent simultaneously with maleic anhydride and a saturated monohydric aliphatic alcohol having from 2 to 6 carbon atoms, the said rubber, anhydride and alcohol having a ratio of 2:1:4 in the presence of an organic peroxide catalyst at a temperature between 70° C. and 150° C., and isolating the product by removal of the solvent and excess alcohol.

5. A process for the manufacture of adhesive compositions resistant to mineral oils which consists in reacting rubber in solution in an organic solvent simultaneously with maleic anhydride and a saturated monohydric aliphatic alcohol having from 2 to 6 carbon atoms, the said rubber, anhydride and alcohol having a ratio of 2:1:4 in the presence of an organic peroxide catalyst at a temperature between 70° C. and 150° C., and precipitating the reaction mixture into industrial alcohol to purify the product.

6. A process for the manufacture of adhesive compositions resistant to mineral oils which comprises dissolving in the proportion of 68 gms. corresponding to one molecule of crepe rubber in 1700 c. c. of benzene containing 32.8 gms. corresponding to ⅓ of a molecule of maleic anhydride, 170 c. c. of ethyl alcohol and 6.8 gms. of benzoyl peroxide, and heating this solution for about twenty-four hours under reflux at about 80° C. on a steam bath.

KENNETH CHARLES ROBERTS.